US011824199B2

(12) United States Patent
Kim et al.

(10) Patent No.: US 11,824,199 B2
(45) Date of Patent: Nov. 21, 2023

(54) METAL HALIDE CATHODE ITH ENRICHED CONDUCTIVE ADDITIVE

(71) Applicants: International Business Machines Corporation, Armonk, NY (US); Daimler AG, Stuttgart (DE)

(72) Inventors: Jangwoo Kim, San Jose, CA (US); Anthony Fong, San Jose, CA (US); Tobias Glossmann, Birmingham, MI (US); Young-hye Na, San Jose, CA (US); Maxwell Giammona, Fremont, CA (US); Eunseok Lee, Cupertino, CA (US)

(73) Assignees: International Business Machines Corporation, Armonk, NY (US); Daimler AG, Stuttgart (DE)

( * ) Notice: Subject to any disclaimer, the term of this patent is extended or adjusted under 35 U.S.C. 154(b) by 271 days.

(21) Appl. No.: 16/932,458

(22) Filed: Jul. 17, 2020

(65) Prior Publication Data

US 2022/0020996 A1  Jan. 20, 2022

(51) Int. Cl.
*H01M 4/62* (2006.01)
*H01M 4/58* (2010.01)
*H01M 10/0525* (2010.01)
*H01M 4/02* (2006.01)
*H01M 4/136* (2010.01)

(52) U.S. Cl.
CPC ........... *H01M 4/625* (2013.01); *H01M 4/582* (2013.01); *H01M 10/0525* (2013.01); *H01M 4/136* (2013.01); *H01M 2004/021* (2013.01); *H01M 2004/028* (2013.01)

(58) Field of Classification Search
CPC ...... H01M 4/136; H01M 4/582; H01M 4/625; H01M 10/052; H01M 10/0525
See application file for complete search history.

(56) References Cited

U.S. PATENT DOCUMENTS

| 5,510,209 A * | 4/1996 | Abraham | H01M 12/08 |
| | | | 429/231.95 |
| 8,277,683 B2 | 10/2012 | Deng et al. | |
| 9,455,439 B2 | 9/2016 | Dai et al. | |
| 10,236,500 B2 | 3/2019 | Zhamu et al. | |
| 2011/0129726 A1 * | 6/2011 | Tsukamoto | H01M 50/55 |
| | | | 29/623.2 |
| 2013/0089795 A1 * | 4/2013 | Chase | H01M 12/08 |
| | | | 264/105 |
| 2014/0099547 A1 * | 4/2014 | Parans Paranthaman | |
| | | | H01M 4/525 |
| | | | 427/126.6 |
| 2014/0255802 A1 * | 9/2014 | Barde | H01M 12/08 |
| | | | 429/405 |
| 2015/0044552 A1 * | 2/2015 | Okita | H01M 10/0567 |
| | | | 429/188 |
| 2016/0351874 A1 * | 12/2016 | Kang | H01M 50/403 |
| 2017/0256795 A1 | 7/2017 | Semenenko et al. | |
| 2017/0273066 A1 * | 9/2017 | McBeath | H04W 52/146 |
| 2018/0083331 A1 | 3/2018 | Mitlin et al. | |
| 2018/0351203 A1 * | 12/2018 | Tamai | H01M 4/505 |
| 2019/0165374 A1 | 5/2019 | Zhamu et al. | |
| 2019/0221887 A1 * | 7/2019 | Kim | H01M 10/0569 |
| 2019/0267626 A1 | 8/2019 | Liang et al. | |
| 2019/0341618 A1 * | 11/2019 | Mane | H01M 10/0525 |
| 2019/0341650 A9 | 11/2019 | Lanning et al. | |
| 2020/0083577 A1 | 3/2020 | Oh | |
| 2020/0185709 A1 * | 6/2020 | Zhou | H01M 4/04 |
| 2020/0335767 A1 * | 10/2020 | Archer | H01M 4/747 |
| 2021/0242440 A1 * | 8/2021 | Reis | H01M 50/516 |

FOREIGN PATENT DOCUMENTS

| CN | 103178245 A | 6/2013 |
| CN | 108054362 A | 5/2018 |
| CN | 107032345 A | 5/2019 |
| CN | 110112384 A | 11/2020 |
| CN | 108832087 A | 4/2021 |
| WO | 2019142060 A1 | 7/2019 |

OTHER PUBLICATIONS

Grewel et al., Critical Impact of Graphene Functionalization for Transition Metal Oxide/Graphene Hybrids on Oxygen Reduction Reaction, The Journal of Physical Chemistry C 122:10017-10026 (2018).
Nishioka et al., Expansion of the Potential Region for Sustained Discharge of Non-aqueous Li—O2 Batteries Using an Oxygen-enriched Carbon Cathode, The Chemical Society of Japan (CSJ) Journals 48(6):1-13 (2019).
International Search Report and Written Opinion for counterpart PCT Application No. PCT/IB2021/055728 dated Sep. 28, 2021.
Cabana et al., Beyond Intercalation-Based Li-Ion Batteries: The State of the Art and Challenges of Electrode Materials Reacting Through Conversion Reactions, Advanced Energy Materials 22:E170-E192 (2010).
Etacheri et al., Challenges in the development of advanced Li-ion batteries: a review, Energy & Environmental Science 4:3243-3262 (2011).
Heller et al., Potentially implantable miniature batteries, Analytical and Bioanalytical Chemistry 385:469-473 (2006).
Karden et al., Energy storage devices for future hybrid electric vehicles, Journal of Power Sources 168:2-11 (2007).
Kim et al., Reduced Graphene Oxide/LiI Composite Lithium Ion Battery Cathodes, Nano Letters 17:6893-6899 (2017).

(Continued)

*Primary Examiner* — Jeremiah R Smith
(74) *Attorney, Agent, or Firm* — Karen Canaan; CanaanLaw, P.C.

(57) ABSTRACT

A rechargeable metal halide battery shows increased metal halide utilization with the introduction of electronegative heteroatom-enriched conductive additives into a metal halide cathode incorporated into an electrically conductive material. The electronegative heteroatom-enriched conductive additives include nitrogen-doped carbon, such as nitrogen-doped single layer graphene, and oxygen-enriched carbon, such as acid-treated carbon black. The modified batteries utilize 20-30% more metal halide than unmodified batteries resulting in enhanced specific capacity and energy density.

30 Claims, 10 Drawing Sheets

(56) References Cited

OTHER PUBLICATIONS

Li et al., Anchoring Iodine to N-Doped Hollow Carbon Fold-Hemisphere: Toward a Fast and Stable Cathode for Rechargeable Lithium-Iodine Batteries, ACS Applied Materials & Interfaces 9:20508-20518 (2017).
Lu et al., A rechargeable iodine-carbon battery that exploits ion intercalation and iodine redox chemistry, Nature Communications 8(527):1-10 (2017).
Nitta et al., Li-ion battery materials: present and future, Materials Today 18(5):252-264 (2015).
Sharief et al., Synthesis of few-layer graphene-like sheets from carbon-based powders via electrochemical exfoliation, using carbon black as an example, Journal of Material Science (2017) (DOI 10.1007/s10853-017-1275-3).
Tarascon et al., Issues and challenges facing rechargeable lithium batteries, Nature 414:359-367 (2001).
Wang et al., Rechargeable lithium/iodine battery with superior high-rate capability by using iodine-carbon composite as cathode, Electronic Supplementary Information (ESI) for Energy & Environmental Science, Royal Society of Chemistry, pp. 1-5 (2011).
Xu et al., Nonaqueous Liquid Electrolytes for Lithium-Based Rechargeable Batteries, Chemical Reviews 104(10):4303-4417 (2004).

\* cited by examiner

METAL HALIDE CATHODE WITH ENRICHED CONDUCTIVE ADDITIVE

JOINT RESEARCH AGREEMENT

The subject matter of this disclosure describes activities undertaken within the scope of a joint research agreement that was in place before the effective date of the instant application. The parties to the joint research agreement are International Business Machines Corporation (Armonk, New York, USA) and Mercedes-Benz Research and Development North America, Inc. (Sunnyvale, California, USA).

TECHNICAL FIELD

The present invention relates generally to rechargeable metal halide batteries, and more specifically to rechargeable metal halide batteries with enriched cathodes.

BACKGROUND OF THE INVENTION

Rechargeable batteries are in high demand for a wide range of applications, from small batteries for industrial and medical devices, to larger batteries for electric vehicles and grid energy storage systems. There are two types of rechargeable batteries currently in use: (i) batteries that run via electrochemical intercalation/de-intercalation behavior of acting ions and (ii) batteries that run via conversion reaction of active electrode/electrolyte materials. The most well-known and widely used rechargeable batteries are lithium-ion batteries, which use an intercalated lithium compound as one electrode material and have the lithium ion move back and forth in the pond of electrolyte. Lithium-ion batteries suffer from shortcomings that need to be overcome in order to meet the high standard of demand in the market. Slow charging/discharging rates and the high cost of cathode materials, such as lithium nickel manganese cobalt oxide (NMC), lithium nickel cobalt aluminum oxide (NCA), lithium cobalt oxide (LCO), and lithium iron phosphate (LFP), prohibit lithium-ion batteries from moving into a wide range of applications.

SUMMARY OF THE INVENTION

The present invention overcomes the need in the art by providing a rechargeable metal halide battery with increased metal halide utilization and high specific capacity through the introduction of electronegative heteroatom-enriched conductive additives into the metal halide cathode.

In one embodiment, the present invention relates to a battery, comprising: an anode; an electrolyte comprising at least one ion-conducting salt and at least one solvent; and a cathode comprising a metal halide incorporated into an electrically conductive material that includes an electronegative heteroatom-enriched carbon, wherein the electrolyte is in contact with the anode, the cathode, and an oxidizing gas.

In one aspect, the present invention relates to a method of fabricating a rechargeable metal halide battery comprising: forming a battery stack comprising an anode, an electrolyte comprising at least one ion-conducting salt and at least one solvent, a cathode comprising a metal halide incorporated into an electrically conductive material that includes an electronegative heteroatom-enriched carbon, and a separator positioned between the anode and the cathode; and introducing an oxidizing gas into the battery stack, wherein the electrolyte is in contact with the anode, the cathode, and the oxidizing gas.

In other embodiments and aspects, the electronegative heteroatom is selected from the group consisting of fluorine, chlorine, oxygen, and nitrogen.

In further embodiments and aspects, the electronegative heteroatom-enriched carbon comprises nitrogen-doped carbon and/or oxygen-enriched carbon.

In a further embodiment, the present invention relates to a battery, comprising: an anode; an electrolyte comprising at least one ion-conducting salt and at least one solvent; and a cathode comprising a metal halide incorporated into an electrically conductive material that includes nitrogen-doped carbon, wherein the electrolyte is in contact with the anode, the cathode, and an oxidizing gas.

In another embodiment, the present invention relates to a battery, comprising: an anode; an electrolyte comprising at least one ion-conducting salt and at least one solvent; and a cathode comprising a metal halide incorporated into an electrically conductive material that includes oxygen-enriched carbon, wherein the electrolyte is in contact with the anode, the cathode, and an oxidizing gas.

In other aspects and embodiments, the weight ratio of the nitrogen-doped carbon to the electrically conductive material ranges from 100:0 to 1:99.

In further aspects and embodiments, the nitrogen-doped (N-doped) carbon is selected from the group consisting of N-doped carbon black, N-doped graphene, N-doped carbon nanotubes, N-doped carbon dots, and combinations thereof.

In other aspects and embodiments, the oxygen-enriched carbon has an oxygen to carbon ratio between 0.015 and 0.045.

In further aspects and embodiments, the oxygen-enriched carbon is formed by acid treatment of carbon with an inorganic acid and/or an organic acid.

In other aspects and embodiments, the inorganic acid is selected from the group consisting of hydrogen fluoride (HF), hydrogen chloride (HCl), hydrogen bromide (HBr), hydrogen iodide (HI), perchloric acid ($HClO_4$), sulfuric acid ($H_2SO_4$), nitric acid ($HNO_3$), and combinations thereof.

In further aspects and embodiments, the organic acid is selected from the group consisting of oxalic acid ($C_2H_2O_4$), citric acid ($C_6H_8O_7$), succinic acid ($C_4H_6O_4$), tartaric acid ($C_4H_6O_6$), malic acid ($C_4H_6O_5$) butyric acid ($C_4H_4O_2$), and combinations thereof.

In other aspects and embodiments, the electrically conductive material comprises a porous carbon material selected from the group consisting of carbon black, carbon nanotubes, carbon nanofibers, carbon dots, activated carbon, amorphous carbon, graphite, graphene, graphene oxide, and combinations thereof.

In further aspects and embodiments, the electronegative heteroatom-enriched carbon is formed by treating the electrically conductive material with a procedure selected from the group consisting of chemical treatment with oxidizing agents, plasma treatment, ozone treatment, chemical vapor deposition, pyrolysis, and combinations thereof.

In further aspects and embodiments, the porous carbon is in the form of particles, powders, paper, foam, fibers, sheets, discs, rods, and/or foils.

In other aspects and embodiments, metal halide in the cathode has a weight percentage in the range of 40% to 90%.

In further aspects and embodiments, the metal halide comprises (i) a metal ion selected from the group consisting of $Li^+$, $Mg^+$, $Zn^+$, $Al^+$, $Na^+$, and combinations thereof; and (ii) a halide ion selected from the group consisting of I⁻, Br⁻, Cl⁻, F⁻, and combinations thereof.

In other aspects and embodiments, the electrolyte comprises at least one lithium salt as the at least one ion-conducting salt and the at least one solvent comprises at least one nitrile and/or at least one heterocyclic compound.

In further aspects and embodiments, the anode comprises at least one alkali metal and/or at least one alkaline earth metal.

In other aspects and embodiments, the oxidizing gas is selected from the group consisting of oxygen, air, nitric oxide, nitrogen dioxide, and combinations thereof.

Additional aspects and/or embodiments of the invention will be provided, without limitation, in the detailed description of the invention that is set forth below.

DETAILED DESCRIPTION OF THE INVENTION

Figure 1:
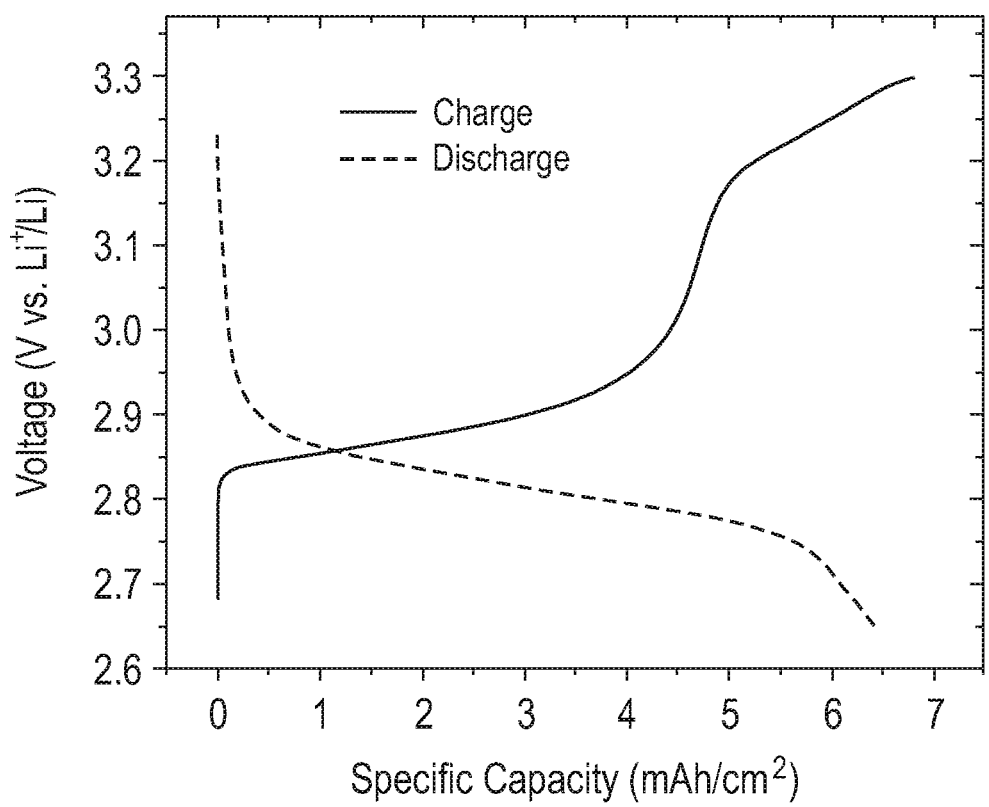
FIG. 1 is a graph showing the charge and discharge behavior of a rechargeable lithium iodide (LiI) battery cell assembled with a cathode including nitrogen-doped single layer graphene (NSLG) as a conductive additive (Example 2).

Set forth below is a description of what are currently believed to be preferred aspects and/or embodiments of the claimed invention. Any alternates or modifications in function, purpose, or structure are intended to be covered by the appended claims. As used in this specification and the appended claims, the singular forms "a," "an," and "the" include plural referents unless the context clearly dictates otherwise. The terms "comprise," "comprised," "comprises," and/or "comprising," as used in the specification and appended claims, specify the presence of the expressly recited components, elements, features, and/or steps, but do not preclude the presence or addition of one or more other components, elements, features, and/or steps.

As used herein, the term "metal halide" refers to a compound having a metal and a halogen. The metals of metal halides may be any metal in Groups 1 to 16 of the periodic chart but will typically be Group 1 alkali metals.

As used herein, the term "cathode" refers to the positive electrode of a battery cell that receives electrons from an external circuit and is reduced during discharging, and transfers them to an external circuit through oxidation during charging. In a metal halide battery, the cathode material comprises a metal halide as defined above.

As used herein, the term "anode" refers to the negative electrode of a battery cell that transfers electrons to an external circuit through oxidation during discharging, and receives them from an external circuit and is reduced during charging.

As used herein, the term "electrolyte" refers to a material that provides for ion transport between the anode and cathode of a battery cell. An electrolyte acts as a conduit for ion transport through its interaction with the anode and the cathode. Upon battery charging, an electrolyte facilitates the movement of ions from the cathode to the anode, whereas upon discharge, the electrolyte facilitates the movement of ions from the anode to the cathode. In rechargeable batteries, the electrolyte promotes ion cycling between the anode and the cathode.

As used herein, the term "oxidizing gas" refers to a gas that induces a reduction-oxidation (redox) reaction in a battery cell. Examples of oxidizing gases include, without limitation, oxygen, air, nitric oxide, nitrogen dioxide, and combinations thereof. As is known to those of skill in the art, a redox reaction is a reaction that transfers electrons between (i) a reducing agent that undergoes oxidation through the loss of electrons and (ii) an oxidizing agent that undergoes reduction through the gain of electrons. Within the context of the present invention, the oxidizing gas works in concert with the electrolyte to form a stable SEI (solid-electrolyte interphase) layer on the surface of electrodes of a rechargeable metal halide battery, and promote the redox reaction of active cathode materials.

As used herein, the terms "enrichment" and "enriched" refer to a chemical process that increases the efficiency of a battery component. Examples of chemical enrichment include, without limitation, doping and modification. The term "doped" as used herein refers to the intentional introduction of impurities into a battery component for the purpose of modulating its electrical and/or structural properties. The terms "modification" and/or "modified" as used herein refer to the process of changing the surface chemistry of a battery component. Within the context of the present invention, the term "doped" is used to refer to the modification of a conductive carbon additive with nitrogen, and the term "enriched" is used to refer to the modification of a conductive carbon additive with oxygen.

As used herein, the term "heteroatom" is used to refer to atoms other than carbon or hydrogen.

As used herein, the term "electronegative" is used to refer to the tendency of an atom to attract a bonding pair of electrons. Examples of electronegative elements include, without limitation, fluorine, chlorine, oxygen, and nitrogen.

In one embodiment, the rechargeable metal halide battery comprises an anode, a cathode comprising a metal halide and an electrically conductive material, an electrolyte, and an oxidizing gas, wherein the electrolyte is in contact with the anode, the cathode, and the oxidizing gas. In another embodiment, the rechargeable metal halide battery comprises an anode, a cathode comprising a metal halide incorporated into an electrically conductive material, an ion-conducting electrolyte, and an oxidizing gas, wherein the electrolyte is in contact with the anode, the cathode, and the oxidizing gas.

In a further embodiment, the anode may be comprised of at least one alkali metal and/or at least one alkaline earth metal. In another embodiment, the metal halide comprises (i) a metal ion selected from the group consisting of $Li^+$, $Mg^+$, $Zn^+$, $Al^+$, $Na^+$, and combinations thereof; and (ii) a halide ion selected from the group consisting of $I^-$, $Br^-$, $Cl^-$, $F^-$, and combinations thereof. In a further embodiment, the total amount of metal halide in the cathode is in the range of 40% to 90% by weight. In another embodiment, the total metal halide in the cathode is in the range of 50% to 90%. In a further embodiment, the total metal halide in the cathode is in the range of 60% to 90%. In another embodiment, the total metal halide in the cathode is in the range of 60% to 90%. In a further embodiment, the total metal halide in the cathode is in the range of 70% to 80%.

In another embodiment, the electrically conductive material comprises an electronegative heteroatom-enriched carbon, wherein the electronegative heteroatoms are selected from the group consisting of fluorine (F), chlorine (Cl), oxygen (O), nitrogen (N), and combinations thereof. In another embodiment, the electronegative heteroatom-enriched carbon is nitrogen-doped (N-doped) carbon and/or oxygen-enriched carbon. In one embodiment, the N-doped carbon is selected from the group consisting of N-doped carbon black, N-doped graphene, N-doped carbon nanotubes, N-doped carbon dots, and combinations thereof. In another embodiment, the oxygen-enriched carbon is formed by acid treatment of carbon with an inorganic acid and/or an organic acid. In a further embodiment, the weight ratio of the nitrogen-doped carbon to the electrically conductive material ranges from 100:0 to 1:99. In another embodiment, the weight ratio of the nitrogen-doped carbon to the electrically conductive material ranges from 100:0 to 2.5:97.5. In a further embodiment, the weight ratio of the nitrogen-doped carbon to the electrically conductive material ranges from 100:0 to 5:95. In another embodiment, the oxygen-enriched carbon has an oxygen to carbon ratio between 0.015 and 0.045. In a further embodiment, the oxygen-enriched carbon has an oxygen to carbon ratio between 0.020 and 0.045. In another embodiment, the oxygen-enriched carbon has an oxygen to carbon ratio between 3.0 and 4.0.

In a further embodiment, the electrically conductive material is a porous carbon material selected from the group consisting of carbon black, carbon nanotubes, carbon nanofibers, carbon dots, activated carbon, amorphous carbon, graphite, graphene, graphene oxide, and combinations thereof. In another embodiment, the porous carbon material may be in the form of particles, powders, paper, foam, fibers, sheets, discs, rods, and/or foils. In a further embodiment, the electrically conductive material may be treated to form the electronegative heteroatom-enriched carbon with a physical and/or chemical treatment of the carbon and/or precursor material. Examples of such treatments include, without limitation, chemical treatment with oxidizing agents (such as inorganic and/or organic acids), plasma treatment, ozone treatment, chemical vapor deposition, pyrolysis, and combinations thereof. For example, the N-doped carbon and the oxygen-enriched carbon may be formed through physical and/or chemical treatment of the electrically conductive material.

In a further embodiment, the electrolyte comprises a solvent and is ion-conducting. Examples of solvents for the electrolyte include, without limitation, nitriles, heterocyclic compounds, glymes, and combinations thereof. Examples of nitriles include, without limitation, acetonitrile, acrylonitrile, propionitrile, methoxyacetonitrile, 3-methoxypropionitrile (MPN), propylnitrile, cyclopentanecamonitrile, 4-cyanobenzaldehyde, and ethylene glycol bis(propionitrile) (EGBP). Examples of heterocyclic compounds include, without limitation, five- and six-membered rings, such as for example, pyrrolidine, oxolane, 1,3-dioxolane, thiolane, pyrrole, furan, thiophene, piperidine, oxane, thiane, pyridine, pyran, and thiopyran. Examples of glymes include, without limitation, 1,2-dimethoxyethane (DME), 1,2-diethoxyethane, 2-methoxyethyl ether (diglyme), 1,2-bis(2-methoxyethoxy)ethane (triglyme), and bis[2-(2-methoxyethoxy)ethyl] ether (tetraglyme). In one embodiment, the solvent for the electrolyte comprises at least one nitrile and/or at least one heterocyclic compound. For ion-conductivity, the electrolyte may comprise one or more ion-conducting salts. Examples of ion-conducting salts include, without limitation, lithium salts, such as lithium nitrate ($LiNO_3$), lithium fluoride (LiF), lithium bis(trifluoromethanesulfonyl)imide (LiTFSI; $LiC_2F_6NO_4S_2$), lithium trifluoromethanesulfonate ($LiCF_3SO_3$), lithium hexafluorophosphate ($LiPF_6$), lithium hexafluoroarsenate ($LiAsF_6$), lithium perchlorate ($LiClO_4$), lithium tetrafluoroborate ($LiBF_4$), and combinations thereof.

Rechargeable metal halide batteries fabricated with the components described herein may further include a separator between the anode and the cathode. In one embodiment, a battery stack is formed by placing a separator between the anode and the metal halide cathode. In a further embodiment, the battery stack is formed by placing the separator between the anode and the electrically conductive material, the latter of which includes the metal halide cathode and the electronegative heteroatom-enriched carbon. In another embodiment, an electrolyte solution as described herein is used to soak the separator prior to incorporation into the battery stack. In a further embodiment, the electrolyte solution is introduced into the battery stack either during or after formation of the stack. In another embodiment, an oxidizing gas is introduced into the battery stack. In operation, the metal halide battery is charged after introduction of the oxidizing gas to the battery stack. To return the battery to an idle state, the oxidizing gas may be removed by purging the battery with an inert gas. Examples of inert gases include, without limitation, argon (Ar), nitrogen (N), helium (He), neon (Ne), xenon (Xe), krypton (Kr), and combinations thereof.

Figure 2:
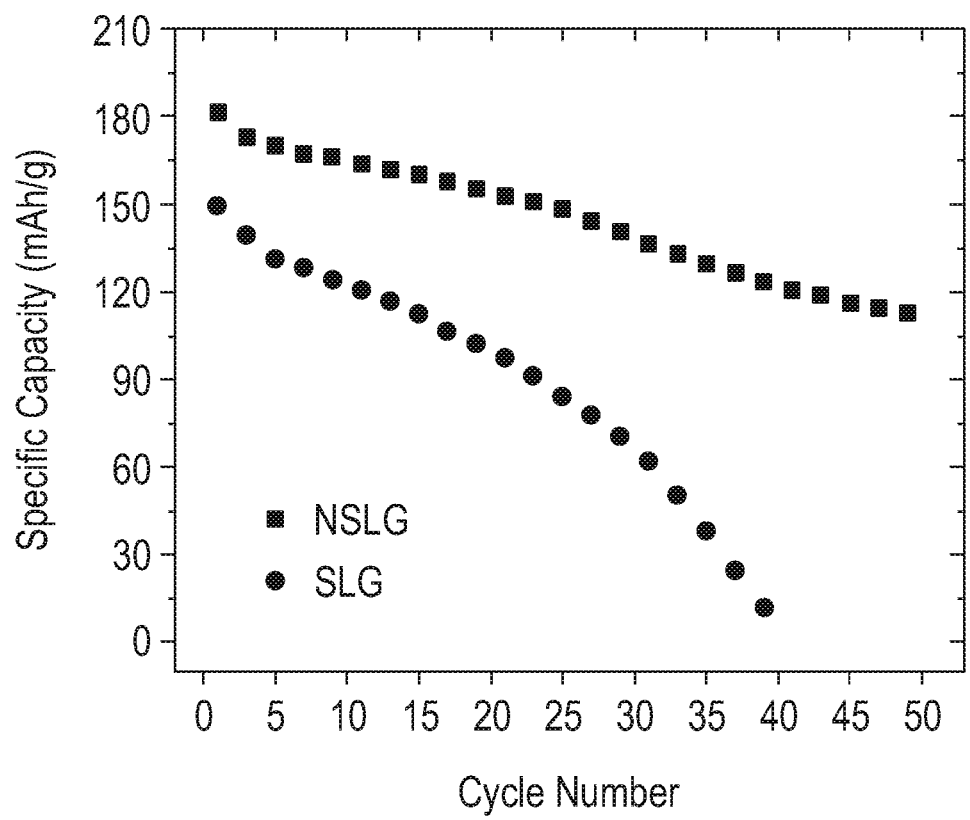
FIG. 2 is a graph showing specific capacity as a function of cycle number for two rechargeable LI battery cells, one assembled with a cathode including the conductive additive NSLG and the other assembled with a cathode including single layered graphene (SLG) as a conductive additive (Example 3).
Figure 7:
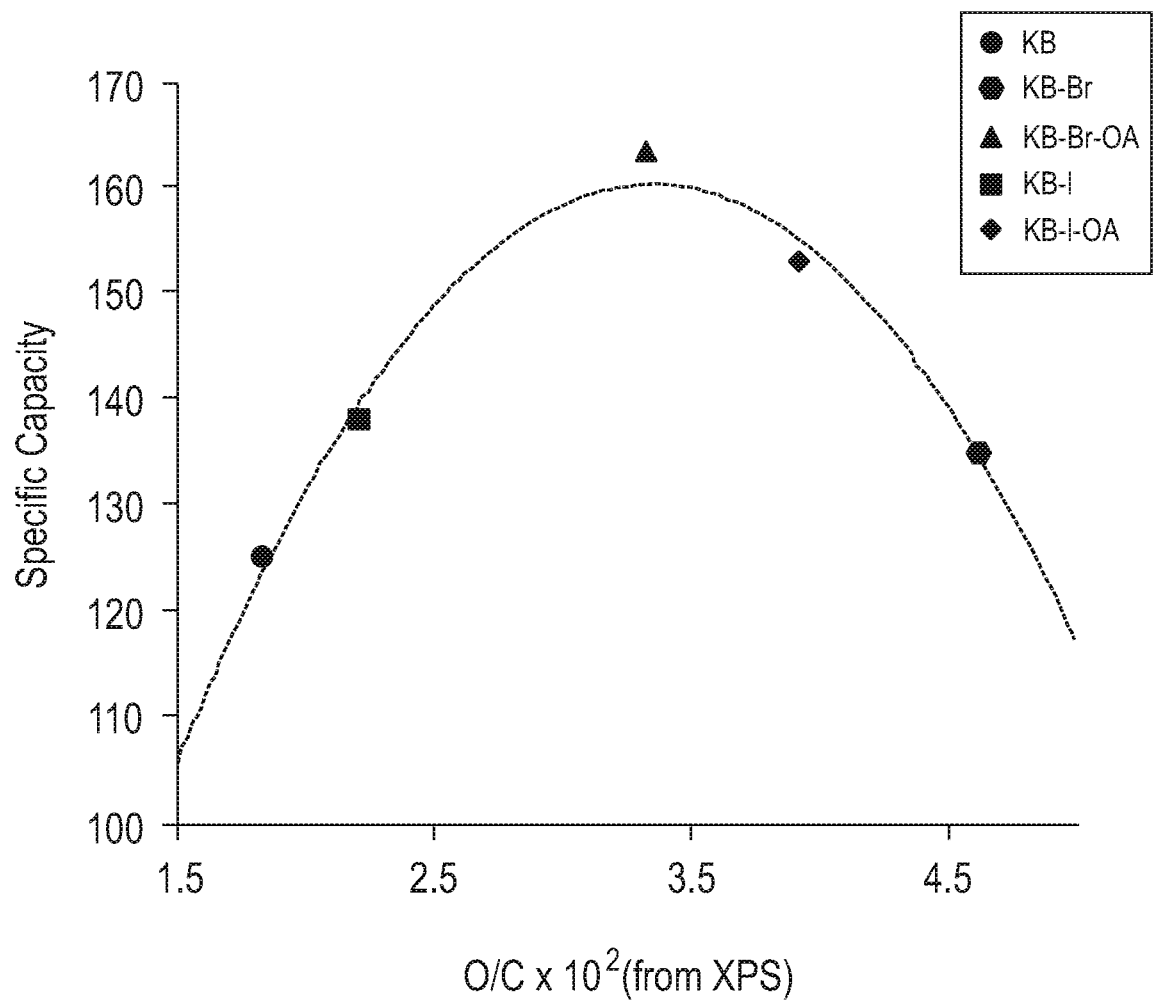
FIG. 7 is a graph showing specific capacity as a function of oxygen enrichment for five rechargeable LiI battery cells with each cathode subject to one of the following oxygen-enrichment treatments: (1) unmodified KB (control with no oxygen enrichment), (2) HBr (KB-Br), (3) HBr and oxalic acid (KB-Br-OA), (4) HI (KB-I), and (5) HI and oxalic acid (KB-I-OA) (Example 9).

Metal halide batteries with modified cathodes as described herein utilize 20-30% more metal halide than batteries with unmodified cathodes resulting in enhanced specific capacity and energy density. FIGS. 2 and 7, which are discussed below, show such enhanced specific capacity and energy density for nitrogen-doped and oxygen-enriched carbon cathodes, respectively. It is to be understood that the nitrogen-doped and oxygen-enriched carbon cathodes described in the figures and examples are meant to be non-limiting examples of electronegative heteroatom-enriched carbon cathodes.

Figure 5:
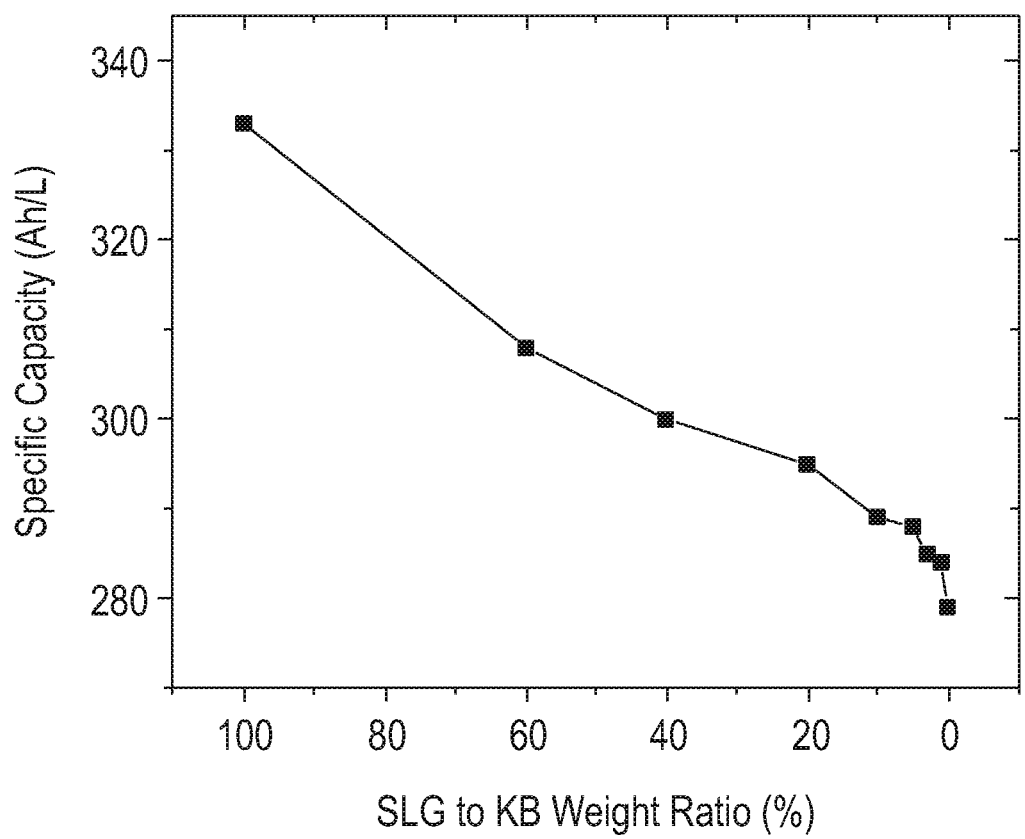
FIG. 5 is a graph showing specific capacity as a function of conductive additive for nine rechargeable LiI battery cells assembled with cathodes including a fixed amount of LiI and different mixtures of SLG and KB (Comparative Example 1).

The introduction of nitrogen-doped carbon as a conductive additive to the cathode of a rechargeable metal halide battery exhibits an energy density>1000 Wh/L (FIG. 3) and increases the usage of the metal halide active material within the battery cell by close to 100% compared to rechargeable metal halide batteries assembled with unmodified carbon (FIG. 5). Even at a metal halide loading above 30 mg/cm$^2$ in a single battery cell, a metal halide cathode mixed with nitrogen-doped carbon results in the battery reaching its theoretical capacity of >200 mAh/g (FIG. 2).

FIG. 1 shows the charge/discharge behavior of a lithium iodide (LiI) battery cell assembled with nitrogen-doped single layer graphene (NSLG) as a cathode conductive material (Example 2). The battery achieves a specific capacity of 6.5 mAh/cm$^2$ after charging at a current density of 0.5 mA/cm$^2$ and discharging at a current density of 0.1 mA/cm$^2$; the specific capacity being equivalent to ~1000 Wh/L of cell level energy density.

FIG. 2 compares a LiI battery cell with an NSLG-treated cathode against a LiI battery cell with a cathode treated with undoped pristine single layer graphene (SLG) (Example 3). The incorporation of NSLG into the cathode results in the battery showing 20% higher specific capacity in the first charge/discharge cycle over the battery with the SLG-treated cathode. The battery with the NSLG-treated cathode also maintains a specific capacity above 100 mAh/g (normalized by the amount of Ii) for more than 50 cycles. By contrast, the capacity of the battery with the SLG-treated cathode had almost completely faded at 40 cycles.

Figure 3:
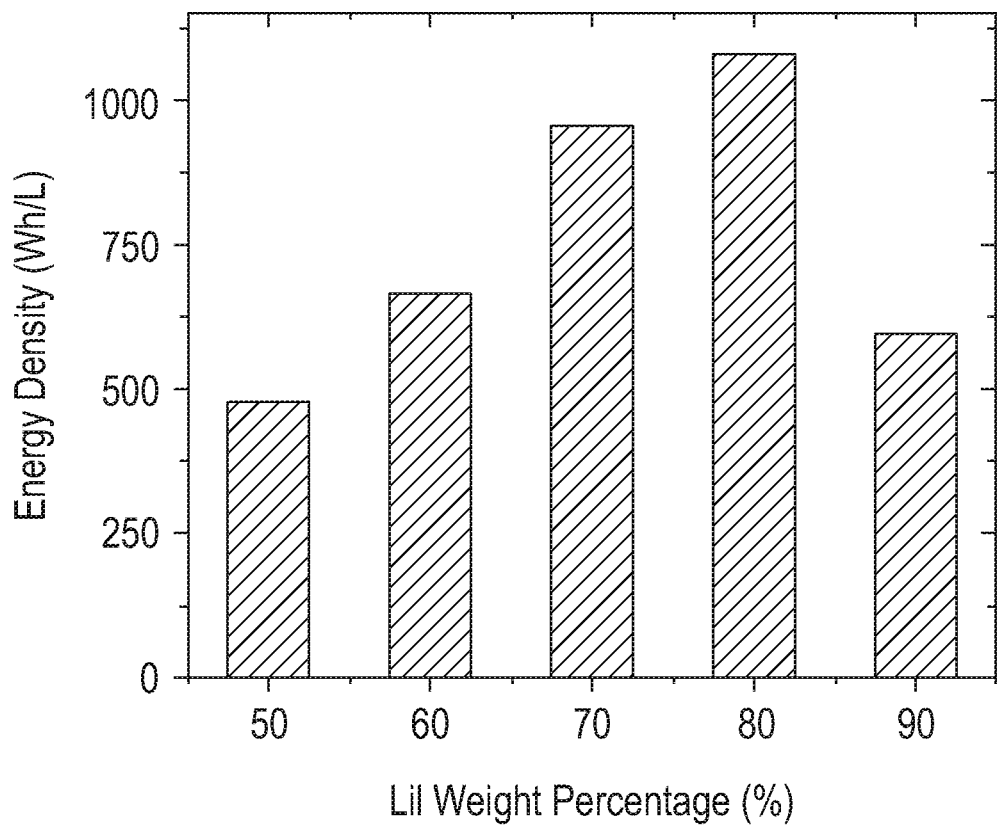
FIG. 3 is a bar graph showing cell level energy density as a function of LiI weight percentage for five rechargeable LiI battery cells assembled with cathodes including a fixed amount of NSLG and different LiI weight percentages (Example 4).

FIG. 3 shows cell level energy density as a function of LiI weight percentage for five nitrogen-doped LiI battery cells prepared with NSLG treated cathodes and the following LiI weight percentages: 50%, 60%, 70%, 80%, and 90% (Example 4). Of the five different LiI weight percentages, the battery with the 80% weight percentage of LiI in the cathode achieved the highest cell level energy density reaching 1100 Wh/L. While the batteries with the 50%, 60%, and 70% weight percentages of LiI showed increasing cell level energy with increasing LiI weight percentage, when the LiI weight percent reached 90%, the cell energy density of the battery was reduced to 600 Wh/L. The results of FIG. 3 demonstrate that cathode composition optimization is important to maximize cell level energy density.

Figure 4:
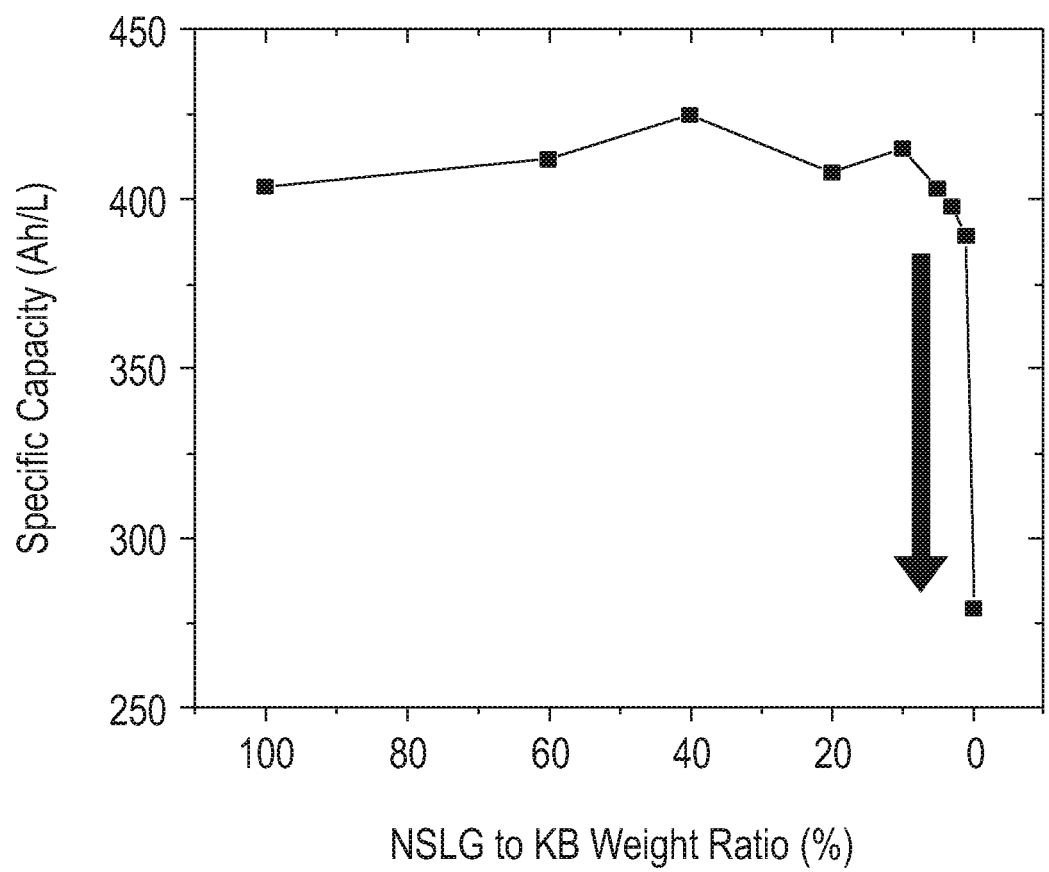
FIG. 4 is a graph showing specific capacity as a function of conductive additive for nine rechargeable LI battery cells assembled with cathodes including a fixed amount of LiI and different mixtures of NSLG and Ketjen black (KB) (Example 5).

FIG. 4 shows the specific capacity of nine LiI battery cells with cathodes enriched with the conductive additives NSLG and Ketjen black (KB) in the following weight ratios (NSLG:KB): 100:0, 60:40, 40:60, 20:80, 10:90, 5:95, 2.5:97.5, 1:99, and 0:100 (Example 5). Of the nine batteries, the battery with the NSLG:KB weight ratio of 40:60 has the highest specific capacity, reaching 420 Ah/L. A comparison of the specific capacities of the cathodes with the NSLG:KB weight ratios of 100:0 (~410 Ah/L) versus 1:99 (~390 Ah/L) shows a specific capacity loss of less than 5% normalized by the cathode volume. By contrast, a comparison of the specific capacities of the cathodes with the NSLG:KB weight ratios of 100:0 (~410 Ah/L) versus 0:100 (~280 Ah/L) shows a specific capacity loss of more than 30%. The results of FIG. 4 demonstrate that even a small amount of a nitrogen-doped conductive additive can improve the specific capacity of a metal halide battery.

FIG. 5 shows the specific capacity of nine LiI battery cells assembled with cathodes enriched with the conductive additives single layer graphene (SLG) and KB in the following weight ratios (SLG:KB): 100:0, 60:40, 40:60, 20:80, 10:90, 5:95, 2.5:97.5, 1:99, and 0:100 (Comparative Example 1). Unlike the batteries with the NSLG:KB enriched cathodes, the batteries with the SLG:KB enriched cathodes show a downward trend in specific capacity (normalized by cathode volume) relative to the amount of SLG in the battery cell.

Example 7 outlines a procedure for preparing oxygen-enriched carbon. The introduction of oxygen-enriched carbon as a conductive additive to the cathode of a rechargeable metal halide battery enhances the specific capacity of the battery resulting in the battery using 20-30% more metal halide than metal halide batteries assembled with unmodified carbon (FIGS. 6-10).

In one embodiment, the oxygen-enriched carbon may be formed by chemically modifying a carbon material with one or more acids. For example, in Example 7, two different types of carbon powder, carbon black (KB) and graphene oxide (GO), are oxidized to immobilize oxygen moieties on the surface of carbon powder particles. In Example 7, the carbon powders were treated with a hydrohalic acid followed by an oxalic acid; however, it is to be understood that other inorganic and/or organic acids may be used to acid-treat a carbon material to form oxygen-enriched carbon. Examples of inorganic acids that may be used for acid treatment include, without limitation, hydrogen fluoride (HF), hydrogen chloride (HCl), hydrogen bromide (HBr), hydrogen iodide (HI), perchloric acid ($HClO_4$), sulfuric acid ($H_2SO_4$), nitric acid ($HNO_3$), and combinations thereof. Examples of organic acids that may be for acid treatment of include, without limitation, oxalic acid ($C_2H_2O_4$), citric acid ($C_6H_8O_7$), succinic acid ($C_4H_6O_4$), tartaric acid ($C_4H_6O_6$), malic acid ($C_4H_6O_5$) and butyric acid ($C_4H_8O_2$), and combinations thereof. For cathodes with carbon conductive additives, acid treatment forms an oxidized carbon material that improves the utilization rate of the active metal halide of a rechargeable metal halide battery cell (FIGS. 6-10, Examples 8-12).

Figure 6:
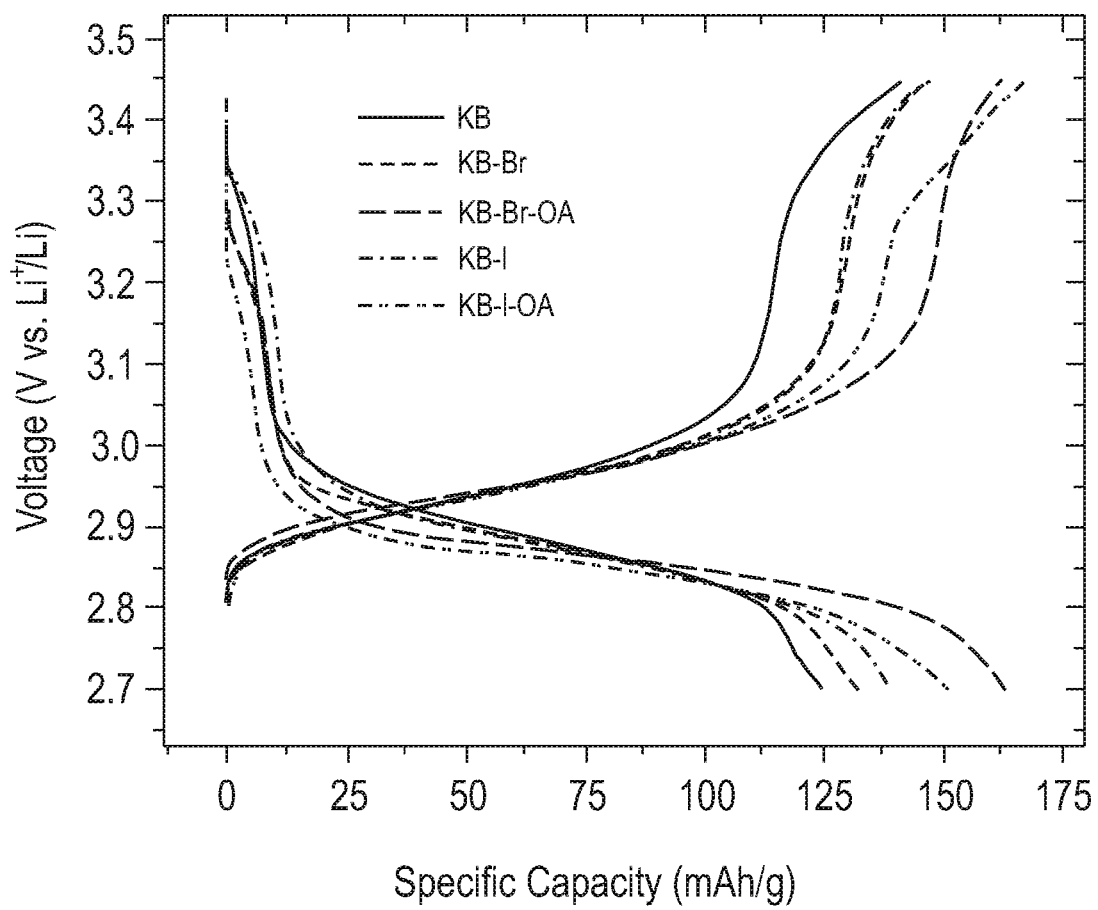
FIG. 6 is a graph showing charge and discharge behaviors of five rechargeable LiI battery cells with each cathode subject to one of the following oxygen-enrichment treatments: (1) unmodified KB (control with no oxygen enrichment), (2) HBr (KB-Br), (3) HBr and oxalic acid (KB-Br-OA), (4) HI (KB-I), and (5) HI and oxalic acid (KB-I-OA) (Example 8).

FIG. 6 compares the charge/discharge cycling performance of five LiI battery cells with each cathode enriched with the conductive additive KB and one of the following acid treatments: (1) unmodified KB (no acid treatment), (2) KB treated with HBr (KB-Br), (3) KB treated with HBr and oxalic acid (KB-Br-OA), (4) KB treated with HI (KB-I), and (5) KB treated with HI and oxalic acid (KB-I-OA) (Example 8). While the batteries with the oxygen-enriched cathodes (batteries (2)-(5)) show improved specific capacity compared to the KB-enriched cathode (battery (1)), the battery with the cathode enriched with KB-Br-OA shows the highest specific capacity at 165 mAh/g of LiI, representing a 25% increase over the 125 mAh/g specific capacity of the battery with the KB-enriched cathode.

FIG. 7 compares the extent of oxygen enrichment, defined by the ratio of the oxygen to carbon atomic % (O/C), as measured by x-ray photoelectron spectroscopy, for five LiI battery cells with cathodes with each cathode enriched with the conductive additive KB and one of the following acid treatments: (1) unmodified KB (no acid treatment), (2) KB-Br, (3) KB-Br-OA, (4) KB-I, and (5) KB-I-OA (Example 9) The battery with the cathode enriched with KB-Br-OA shows the highest specific capacity at 165 mAh/g of LiI with an enrichment extent of 3.5% O/C. The battery with the cathode enriched with KB-I-OA also shows a high specific capacity of 155 mAh/g of LiI with an enrichment extent of 3.7% O/C. In FIG. 7, the range of improvement in the specific capacity of the batteries with the oxygen-enriched cathodes ranges from ~1.6% O/C to ~4.6% O/C.

Figure 8:
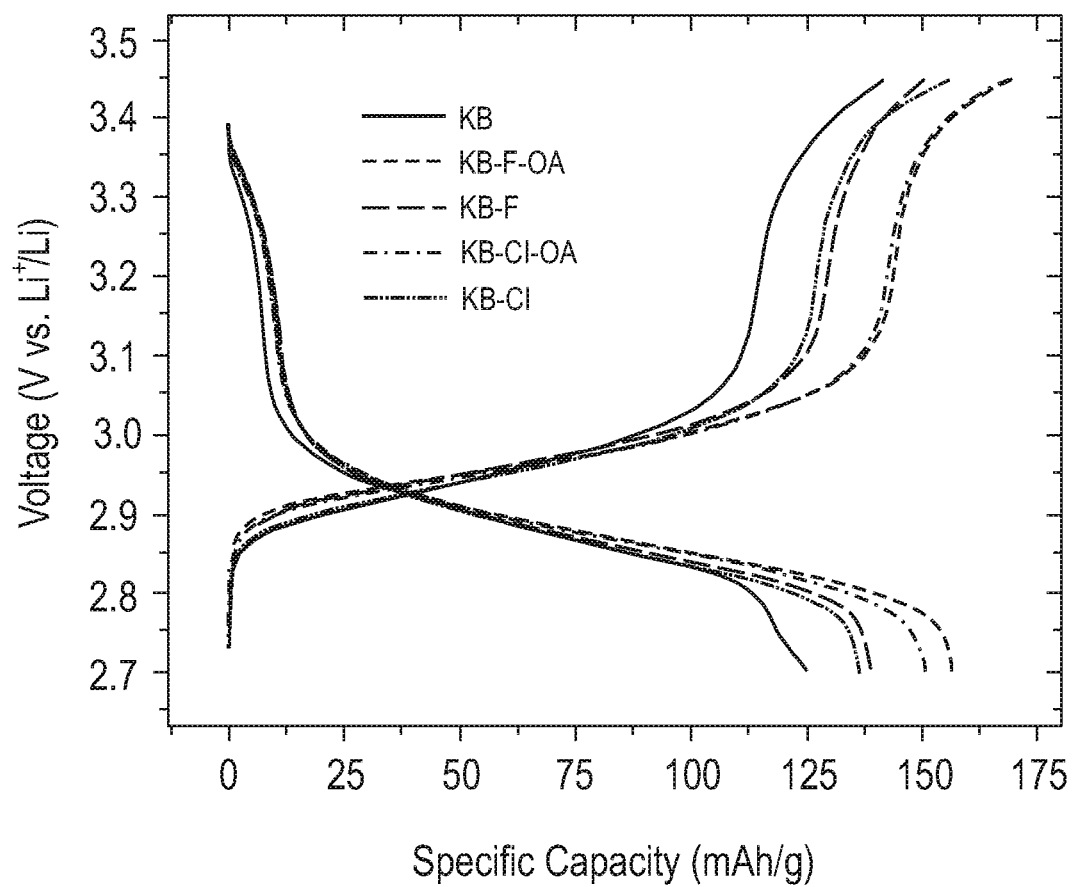
FIG. 8 is a graph showing charge and discharge behaviors of five rechargeable LiI battery cells with each cathode subject to one of the following oxygen-enrichment treatments: (1) unmodified KB (control with no oxygen enrichment), (2) HF (KB-F), (3) HF and oxalic acid (KB-F-OA), (4) HI (KB-Cl), and (5) HI and oxalic acid (KB-Cl-OA) (Example 10).

FIG. 8 compares the charge/discharge cycle performance of five LI battery cells with each cathode enriched with the conductive additive KB and one of the following acid treatments: (1) unmodified KB (no acid treatment), (2) KB treated with HF (KB-F), (3) KB treated with HF and oxalic acid (KB-F-OA), (4) KB treated with HCl (KB-Cl), and (5) KB treated with HCl and oxalic acid (KB-Cl-OA) (Example 10). While the batteries with the oxygen-enriched cathodes (batteries (2)-(5)) show improved specific performance compared to the battery with the KB-enriched cathode (battery (1)), the battery with the cathode enriched with KB-F-OA shows the highest specific capacity at 155 mAh/g of LiI, representing a 20% increase over the 125 mAh/g specific capacity of the battery with the KB-enriched cathode.

Figure 9:
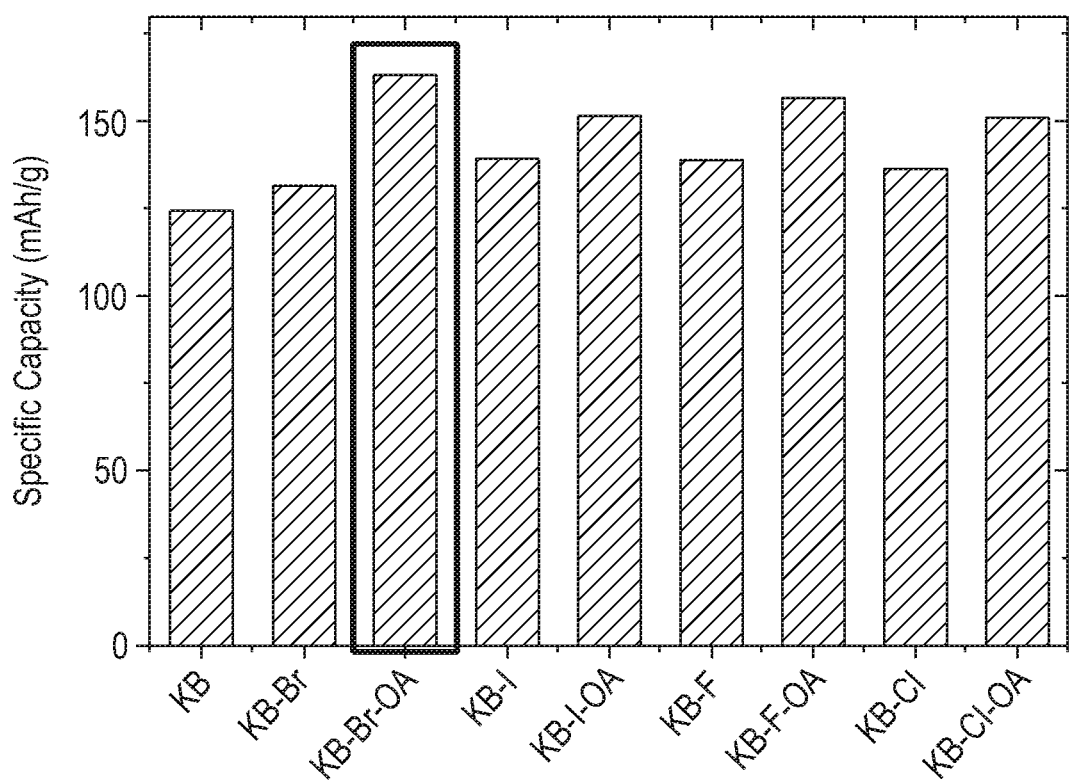
FIG. 9 is a bar graph showing variation in specific discharge capacity of nine rechargeable LiI battery cells with each cathode subject to one of the following oxygen enrichment treatments: (1) unmodified KB (control with no oxygen enrichment), (2) HBr (KB-Br), (3) HBr and oxalic acid (KB-Br-OA), (4) HI (KB-I), (5) HI and oxalic acid (KB-I-OA), (6) HF (KB-F), (7) HF and oxalic acid (KB-F-OA), (8) HI (KB-Cl), and (9) HI and oxalic acid (KB-Cl-OA) (Example 11).

FIG. 9 compares the discharge capacities of nine LiI battery cells with each cathode enriched with the conductive additive KB and one of the following acid treatments: (1) unmodified KB (no acid treatment), (2) KB-Br, (3) KB-Br-OA, (4) KB-I, (5) KB-I-OA, (6) KB-F, (7) KB-F-OA, (8) KB-Cl, and (9) KB-Cl-OA (Example 11). While all of the batteries with the oxygen-enriched cathodes (batteries (2)-(9)) show improved specific performance compared to the battery with the KB-enriched cathode (battery (1)), the battery with the cathode enriched with KB-Br-OA shows the highest specific capacity at 165 mAh/g of LiI, representing a 30% increase over the 125 mAh/g specific capacity of the battery with the KB-enriched cathode.

Figure 10:
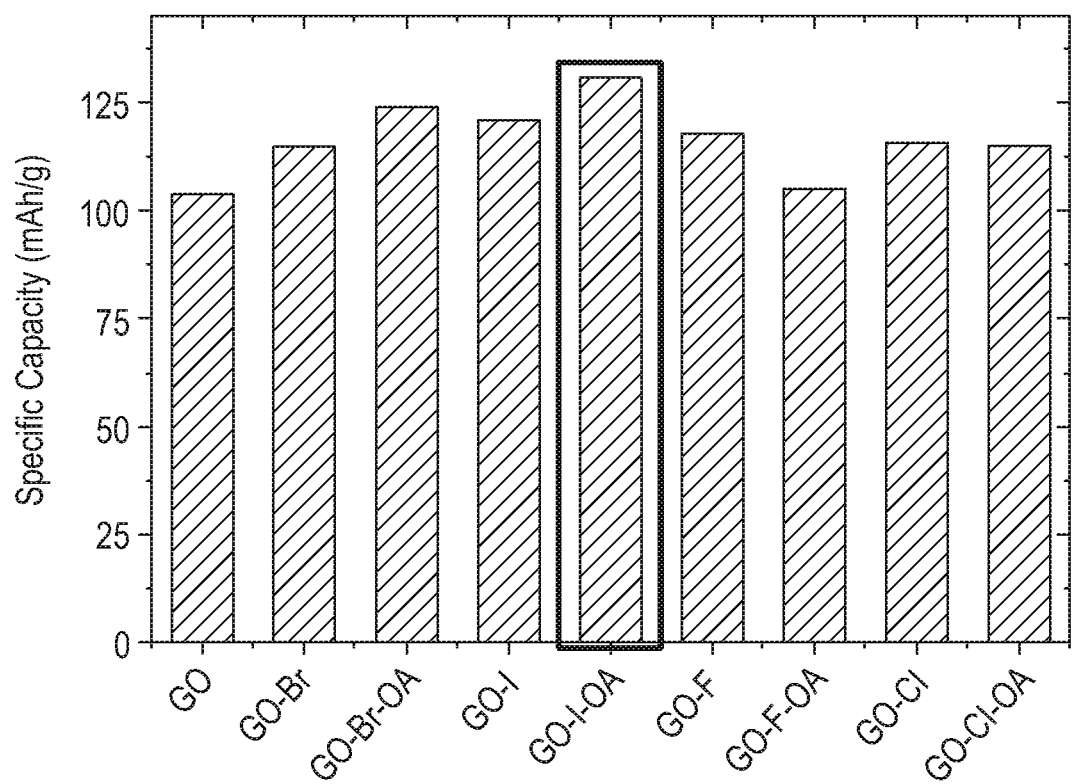
FIG. 10 is a bar graph showing variation in specific discharge capacity of nine rechargeable LiI battery cells with each cathode subject to one of the following oxygen enrichment treatments: (1) unmodified graphene oxide (GO) (control with no oxygen enrichment), (2) HBr (GO-Br), (3) HBr and oxalic acid (GO-Br-OA), (4) HI (GO-I), (5) HI and oxalic acid (GO-I-OA), (6) HF (GO-F), (7) HF and oxalic acid (GO-F-OA), (8) HI (GO-Cl), and (9) HI and oxalic acid (GO-Cl-OA) (Example 12).

FIG. 10 compares the discharge capacities of nine LiI battery cells with each cathode enriched with the conductive additive graphene oxide (GO) and one of the following acid treatments: (1) unmodified graphene oxide (GO), (2) GO treated with HBr (GO-Br), (3) GO treated with HBr and oxalic acid (GO-Br-OA), (4) GO treated with HI (GO-I), (5) GO treated with HI and oxalic acid (GO-I-OA), (6) GO treated with HF (GO-F), (7) GO treated with HF and oxalic acid (GO-F-OA), (8) GO treated with HCl (GO-Cl), and (9) GO treated with HCl and oxalic acid (GO-Cl-OA) (Example 12). While all of the oxygen-enriched cathodes (batteries (2)-(9)) show improved specific capacity compared to the battery with the GO-enriched cathode (battery (1)), the battery with the cathode enriched with GO-I-OA shows the highest specific capacity at 140 mAh/g of LiI, representing a 25% increase over the 105 mAh/g specific capacity of the battery with the GO-enriched cathode.

The descriptions of the various aspects and/or embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the aspects and/or embodiments, the practical application or technical improvement over technologies found in the marketplace, or to enable others of ordinary skill in the art to understand the aspects and/or embodiments disclosed herein.

EXPERIMENTAL

The following examples are set forth to provide those of ordinary skill in the art with a complete disclosure of how to make and use the aspects and embodiments of the invention as set forth herein. While efforts have been made to ensure accuracy with respect to variables such as amounts, temperature, etc., experimental error and deviations should be taken into account. Unless indicated otherwise, parts are parts by weight, temperature is degrees centigrade, and pressure is at or near atmospheric. All components were obtained commercially unless otherwise indicated.

Example 1

Cell Fabrication with Nitrogen-Doped Cathode

The following materials were purchased from Sigma-Aldrich (Sigma-Aldrich Corp., St. Louis, MO, USA): 3-methoxypropionitrile (MPN), lithium nitrate ($LiNO_3$), polytetrafluoroethylene (PTFE), and lithium iodide (LiI). The MPN and $LiNO_3$ were individually dried and stored in an argon filled glovebox (<0.1 ppm $H_2O$, $O_2$). Cathode current collectors were made with the combination of PTFE as a polymeric binder and one or more of the following conductive carbon additives: carbon black (KB), undoped pristine single layer graphene (SLG), and nitrogen-doped single layer graphene (NSLG). KB was purchased from Lion Specialty Chemicals (Lion Special Chemicals Co., Ltd, Tokyo, JP). SLG and NSLG were purchased from ACS Materials (ACS Materials, LLC, Pasadena, CA, USA) and dried at 120° C. overnight before use. A lithium iodide (Ii) cathode was prepared by incorporating the LiI onto the cathode current collector. The LiI cathode was evaluated with a lithium metal anode. A CELGARD® (Celgard, LLC, Charlotte, NC, USA) separator was placed in between the lithium metal anode and the LiI cathode. An electrolyte solution of MPN and $LiNO_3$ was used to wet the separator. All cell assembly was done in the argon filled glovebox. All cell components were placed in a cell equipped with inlet and outlet SWAGELOK® (Swagelok Company, Solon, OH, USA) tubing for oxygen flow. After oxygen was introduced from the inlet tubing outside of the argon filled glovebox, the cell was completely sealed by closing the valves of both the inlet and the outlet tubing. Cathode formulation was kept constant throughout at 72% LiI (~25-30 $mg/cm^2$), 18% carbon (~5-6 $mg/cm^2$), and 10% binder.

Example 2

Nitrogen Doped Single Layer Graphene (NSLG) as a Cathode Conductive Additive

Battery cell performance was measured for a rechargeable LiI battery assembled according to Example 1 with ~30 $mg/cm^2$ of LiI loading and NSLG as a cathode conductive additive. The battery was charged at a current density of 0.5 $mA/cm^2$ and discharged at a current density of 0.1 $mA/cm^2$.

FIG. 1 shows the first cycle charge/discharge performance profile for the battery (voltage, V vs Li$^+$/Li– v. specific gravity, mAh/cm$^2$).

Example 3

Nitrogen Doped Single Layer Graphene (NSLG) Versus Undoped Pristine Single Layer Graphene (SLG) as Cathode Conductive Additives Battery cell cycle performance was compared between two rechargeable LiI batteries prepared according to Example 1 with NSLG as a cathode conductive additive in one battery and SLG as a cathode conductive additive in the other battery. FIG. 2 shows the results of the cycle performance test (specific capacity, mAh/g v. cycle number).

Example 4

Cell Level Energy Density with Nitrogen-Doped Single Layer Graphene (NSLG) as a Cathode Conductive Additive Battery cell level energy density was tested for five rechargeable LiI batteries assembled according to Example 1 with a fixed amount of the conductive additive NSLG and the following different LiI weight percentages: 50%, 60%, 70%, 80%, and 90%. FIG. 3 shows the results of the cell level energy density test (energy density, Wh/L v. LiI wt %), where LiI wt %=LiI weight/total weight of cathode including LiI, NSLG, and binder×100.

Example 5

Nitrogen-Doped Single Layer Graphene (NSLG) and Ketjen Black (KB) as Cathode Conductive Additives Battery cell specific capacity was evaluated for nine rechargeable LiI batteries assembled according to Example 1 with each battery having cathodes with the same LiI loading and the following NSLG:KB weight ratios: 100:0, 60:40, 40:60, 20:80, 10:90, 5:95, 2.5:97.5, 1:99, and 0:100. FIG. 4 shows the results of the specific capacity evaluation (specific capacity, Ah/L v. NSLG:KB wt %), where NSLG:KB wt ratio (%)=mass NSLG/(mass NSLG+mass KB)×100.

Comparative Example 1

Undoped Pristine Single Layer Graphene (SLG) and Ketjen Black (KB) as Cathode Conductive Additives Battery cell specific capacity was evaluated for nine rechargeable LiI batteries assembled according to Example 1 with each battery having cathodes with the same LiI loading and the following SLG:KB weight ratio: 100:0, 60:40, 40:60, 20:80, 10:90, 5:95, 2.5:97.5, 1:99, and 0:100. FIG. 5 shows the results of the specific capacity evaluation (specific capacity, Ah/L v. SLG:KB wt %), where SLG:KB wt ratio (%)=mass SLG/(mass SLG+mass KB)×100.

Example 6

Cell Fabrication with Oxygen-Enriched Cathode

The following materials were purchased from Sigma-Aldrich (Sigma-Aldrich Corp., St. Louis, MO, USA): 3-methoxypropionitrile (MPN), lithium nitrate (LiNO$_3$), polytetrafluoroethylene (PTFE), dimethoxyethane (DME), and lithium iodide (LiI). The MPN, DME, and LNO$_3$ were individually dried and stored in an argon filled glovebox (<0.1 ppm H$_2$O, O$_2$). A carbon disc was made with PTFE as a polymeric binder and the modified carbon types described in Examples 8-12. For each carbon type, the two-step modification process resulted in eight different freestanding cathodes. A lithium iodide (LiI) cathode was prepared by incorporating the LiI onto one of the eight different freestanding carbon discs. All the cathodes were evaluated with lithium metal anodes. A CELGARD® (Celgard, LLC, Charlotte, NC, USA) separator was placed in between the lithium metal anode and the LiI cathode. An electrolyte solution of MPN, DME, and LiNO$_3$ was used to wet the separator. All cell assembly was done in the argon filled glovebox. All cell components were placed in a cell equipped with inlet and outlet SWAGELOK® (Swagelok Company, Solon, OH, USA) tubing for oxygen flow. After oxygen was introduced from the inlet tubing outside of the argon filled glovebox, the cell was completely sealed by closing the valves of both the inlet and the outlet tubing.

Example 7

Preparation of Oxygen-Enriched Carbon

Carbon modification was carried out in a two-step process. In step 1, carbon was treated with H-X acid (X=F, Cl, Br, I) to decorate the carbon surface with carboxylic acid groups. In step 2, the carbon from step 1 was treated with oxalic acid (Sigma-Aldrich Corp., St. Louis, MO, USA) to further increase the oxygen content of the carbon surface. The resulting material was filtered and dried for use in cathodes after undergoing step 1 only, as well as step 1 and step 2 in sequence. Carbon powder (KB or Graphene Oxide (GO)) was measured out, mixed with 9:1 (v/v) H$_2$O:EtOH solution at a mass concentration of 1 mg/mL and sonicated in a bath sonicator for 30 minutes. To this mixture, concentrated H-X (X=Br, I, F, Cl) was added at a concentration of 5 mL H-X/100 mL of solution. Carbon/H-X solutions were sealed with parafilm and left to stir for 16 hours. After stirring, the solutions were transferred to centrifuge tubes and centrifuged at 10,000 rpm for 20 minutes. The supernatant solution was decanted out of the tube leaving the carbon. The carbon-containing centrifuge tube was then filled DI-H$_2$O and sonicated for 20 minutes. This procedure was carried out three or more times until the post-centrifuged supernatant solution reached a neutral pH as measured by pH paper. The resulting carbon was dried inside a vacuum oven at 65° C. The carbon powder from step 1 was measured out, mixed with 9:1 (v/v) H$_2$O:EtOH solution at mass concentration of 1 mg/mL, and sonicated in a bath sonicator for 30 minutes. To this mixture, solid oxalic acid was added at a concentration of 15 mg/mL of carbon solution. The carbon/oxalic acid solutions were sealed with parafilm and left to stir for 5 hours. After stirring, the solutions were transferred to centrifuge tubes and centrifuged at 10,000 rpm for 20 minutes. The supernatant solution was decanted out of the tube leaving the carbon. The carbon containing centrifuge tube was then filled with H$_2$O and sonicated for 20 minutes. This procedure was carried out three or more times until the post-centrifuged supernatant solution reached a neutral pH as measured by pH paper. The resulting carbon was dried inside a vacuum oven at 65° C.

Example 8

Oxygen-Enriched Ketjen Black (KB) as a Cathode Conductive Additive; Acid Treatment with HBr, HI, and Oxalic Acid The charge/discharge cycle performance was tested for five rechargeable metal halide battery cells with oxygen-enriched cathodes. The battery cells were assembled according to Examples 6 and 7 with each cathode enriched with the conductive additive KB and one of the following acid treatments: (1) unmodified KB (control, no acid treatment), (2) KB treated with HBr (KB-Br), (3) KB treated with HBr and oxalic acid (KB-Br-OA), (4) KB treated with HI (KB-I), and (5) KB treated with HI and oxalic acid (KB-I-OA). The carbon nanoparticle to LiI weight ratio was fixed as 30:70, and the amount of LiI loaded as part of the cathode materials was fixed as ~13±1 mg/cm$^2$. The results of the cycle performance test are shown in FIG. 6.

Example 9

Oxygen-Enriched Ketjen Black (KB) as a Cathode Conductive Additive; Extent of Oxygen Enrichment The extent of oxygen enrichment for the five battery cells of Example 8 was tested. The extent of oxygen enrichment was defined as the ratio of the oxygen to carbon atomic % (O/C), as measured by x-ray photoelectron spectroscopy for each of the five carbons used in the LiI cathodes of Example 8. XPS analysis was performed using a Physical Electronics Quantum ESCA Microprobe (Physical Electronics, Chanhassen, MN, USA) with a monochromatic Al K. X-ray source at 1486.6 eV operating at 15 kV with a flux of 50 watts and an 80-20 beam diameter of 200 microns. Spectra were charge corrected so that the C1s maxima aligned with a binding energy of 284.8 eV. The results of the oxygen enrichment test are shown in FIG. 7.

Example 10

Oxygen-Enriched Ketjen Black (KB) as a Cathode Conductive Additive; Acid Treatment with HF, HCl, and Oxalic Acid The charge/discharge cycle performance was tested for five rechargeable metal halide battery cells with oxygen-enriched cathodes treated with different acids from those of Example 8. The battery cells were assembled according to Examples 6 and 7 with each cathode enriched with the conductive additive KB and one of the following acid treatments: (1) unmodified KB (control, no acid treatment), (2) KB treated with HF (KB-F), (3) KB treated with HF and oxalic acid (KB-F-OA), (4) KB treated with HCl (KB-Cl), and (5) KB treated with HCl and oxalic acid (KB-Cl-OA). The carbon nanoparticle to LiI ratio in weight was fixed as 30:70, and the amount of LiI loaded as part of the cathode materials was fixed as ~13±1 mg/cm$^2$. The results of the cycle performance test are shown in FIG. 8.

Example 11

Oxygen-Enriched Ketjen Black (Kb) as a Cathode Conductive Additive; Discharge Capacity The discharge capacities of nine rechargeable metal halide battery cells with oxygen-enriched cathodes was tested. Nine battery cells were assembled according to Examples 6 and 7 with each of the cathodes enriched with the conductive additive KB and one of the following acid treatments: (1) unmodified KB (control, no acid treatment), (2) KB treated with HBr (KB-Br), (3) KB treated with HBr and oxalic acid (KB-Br-OA), (4) KB treated with HI (KB-I), (5) KB treated with HI and oxalic acid (KB-I-OA), (6) KB treated with HF (KB-F), (7) KB treated with HF and oxalic acid (KB-F-OA), (8) KB treated with HCl (KB-Cl), and (9) KB treated with HCl and oxalic acid (KB-Cl-OA). The carbon nanoparticle to LiI ratio in weight was fixed as 30:70, and the amount of LiI loaded as part of the cathode materials was fixed as ~13±1 mg/cm$^2$. The results of the discharge capacity test are shown in FIG. 9.

Example 12

Oxygen-Enriched Graphene Oxide (GO) as a Cathode Conductive Additive; Discharge Capacity The discharge capacities of nine rechargeable metal halide battery cells with oxygen-enriched cathodes were tested, but with a different conductive additive than in Example 11. Nine battery cells were assembled according to Example 6 and 7 with each cathode enriched with the conductive additive graphene oxide (GO) and one of the following acid treatments: (1) unmodified GO (control, no acid treatment), (2) GO treated with HBr (GO-Br), (3) GO treated with HBr and oxalic acid (GO-Br-OA), (4) GO treated with HI (GO-I), (5) GO treated with HI and oxalic acid (GO-I-OA), (6) GO treated with HF (GO-F), (7) GO treated with HF and oxalic acid (GO-F-OA), (8) GO treated with HCl (GO-Cl), and (9) GO treated with HCl and oxalic acid (GO-Cl-OA). The carbon nanoparticle to LiI ratio in weight was fixed as 30:70, and the amount of LiI loaded as part of the cathode materials was fixed at ~13±1 mg/cm$^2$. The results of the discharge capacity test are shown in FIG. 10.

We claim:

1. A battery, comprising:
    an anode comprising a stable solid electrolyte interphase (SEI) layer;
    an electrolyte comprising at least one ion-conducting salt and at least one solvent; and
    a cathode comprising a stable SEI layer and a metal halide incorporated into an electrically conductive material that is comprised of or includes an electronegative heteroatom-enriched carbon,
    wherein the electrolyte is in contact with the anode, the cathode, and an oxidizing gas, wherein contact of the oxidizing gas and the electrolyte forms the stable SEI layers on the anode and the cathode.

2. The battery of claim 1, wherein the electronegative heteroatom is selected from the group consisting of fluorine, chlorine, oxygen, and nitrogen.

3. The battery of claim 1, wherein the electronegative heteroatom-enriched carbon is comprised of or includes nitrogen-doped carbon.

4. The battery of claim 3, wherein the electrically conductive material is 100% nitrogen-doped carbon.

5. The battery of claim 3, wherein the nitrogen-doped (N-doped) carbon is selected from the group consisting of N-doped carbon black, N-doped graphene, N-doped carbon nanotubes, N-doped carbon dots, and combinations thereof.

6. The battery of claim 3, wherein the electrically conductive material comprises nitrogen doped carbon in a weight percentage greater than zero and less than 100% of the total weight of the electrically conductive material.

7. The battery of claim 1, wherein the electronegative heteroatom-enriched carbon comprises oxygen-enriched carbon.

8. The battery of claim 7, wherein the oxygen-enriched carbon has an oxygen to carbon ratio between 0.015 and 0.045.

9. The battery of claim 7, wherein the oxygen-enriched carbon is formed by acid treatment of carbon with an inorganic acid and/or an organic acid.

10. The battery of claim 9, wherein the inorganic acid is selected from the group consisting of hydrogen fluoride (HF), hydrogen chloride (HCl), hydrogen bromide (HBr), hydrogen iodide (HI), perchloric acid ($HClO_4$), sulfuric acid ($H_2SO_4$), nitric acid ($HNO_3$), and combinations thereof.

11. The battery of claim 9, wherein the organic acid is selected from the group consisting of oxalic acid ($C_2H_2O_4$), citric acid ($C_6H_8O_7$), succinic acid ($C_4H_6O_4$), tartaric acid ($C_4H_6O_6$), malic acid ($C_4H_6O_5$) butyric acid ($C_4H_8O_2$), and combinations thereof.

12. The battery of claim 1, wherein the electrically conductive material comprises a porous carbon material selected from the group consisting of carbon black, carbon nanotubes, carbon nanofibers, carbon dots, activated carbon, amorphous carbon, graphite, graphene, graphene oxide, and combinations thereof.

13. The battery of claim 12, wherein the electronegative heteroatom-enriched carbon is formed by treating the electrically conductive material with a procedure selected from the group consisting of chemical treatment with oxidizing agents, plasma treatment, ozone treatment, chemical vapor deposition, pyrolysis, and combinations thereof.

14. The battery of claim 12, wherein the porous carbon material is in the form of particles, powders, paper, foam, fibers, sheets, discs, rods, and/or foils.

15. The battery of claim 1, wherein the metal halide in the cathode is 40% to 90% of the total weight of the cathode.

16. The battery of claim 1, wherein the metal halide comprises (i) a metal ion selected from the group consisting of $Li^+$, $Mg^+$, $Zn^+$, $Na^+$, and combinations thereof; and (ii) a halide ion selected from the group consisting of $I^-$, $Br^-$, $Cl^-$, $F^-$, and combinations thereof.

17. The battery of claim 1, wherein the electrolyte comprises at least one lithium salt as the at least one ion-conducting salt, and the at least one solvent comprises at least one nitrile and/or at least one heterocyclic compound.

18. The battery of claim 1, wherein the anode comprises at least one alkali metal and/or at least one alkaline earth metal.

19. The battery of claim 1, wherein the oxidizing gas is selected from the group consisting of oxygen, air, nitric oxide, nitrogen dioxide, and combinations thereof.

20. A battery, comprising:
an anode comprising a solid electrolyte interphase (SEI) layer;
an electrolyte comprising at least one ion-conducting salt and at least one solvent; and
a cathode comprising an SEI layer and a metal halide incorporated into an electrically conductive material that is comprised of or includes nitrogen-doped carbon,
wherein the electrolyte is in contact with the anode, the cathode, and an oxidizing gas, wherein contact of the oxidizing gas with the electrolyte forms the SEI layers on the anode and the cathode.

21. The battery of claim 20, wherein the electrically conductive material is 100% nitrogen-doped carbon.

22. The battery of claim 20, wherein the nitrogen-doped (N-doped) carbon is selected from the group consisting of N-doped carbon black, N-doped graphene, N-doped carbon nanotubes, N-doped carbon dots, and combinations thereof.

23. The battery of claim 20, wherein the electrically conductive material comprises a porous carbon material selected from the group consisting of carbon black, carbon nanotubes, carbon nanofibers, carbon dots, activated carbon, amorphous carbon, graphite, graphene, graphene oxide, and combinations thereof.

24. The battery of claim 23, wherein the porous carbon material is in the form of particles, powders, paper, foam, fibers, sheets, discs, rods, and/or foils.

25. The battery of claim 20, wherein the metal halide in the cathode is 40% to 90% of the total weight of the cathode.

26. The battery of claim 20, wherein the metal halide comprises (i) a metal ion selected from the group consisting of $Li^+$, $Mg^+$, $Zn^+$, $Na^+$, and combinations thereof; and (ii) a halide ion selected from the group consisting of $I^-$, $Br^-$, $Cl^-$, $F^-$, and combinations thereof.

27. The battery of claim 20, wherein the electrolyte comprises at least one lithium salt as the ion-conducting salt, and the at least one solvent comprises at least one nitrile and/or at least one heterocyclic compound.

28. The battery of claim 20, wherein the anode comprises at least one alkali metal and/or at least one alkaline earth metal.

29. The battery of claim 20, wherein the oxidizing gas is selected from the group consisting of oxygen, air, nitric oxide, nitrogen dioxide, and combinations thereof.

30. The battery of claim 20, wherein the electrically conductive material comprises nitrogen doped carbon in a weight percentage greater than zero and less than 100% of the total weight of the electrically conductive material.

* * * * *